Aug. 7, 1928.
A. W. BRUCE
1,679,601
TRUCK FOR RAILROAD VEHICLES
Filed May 18, 1927   2 Sheets-Sheet 1
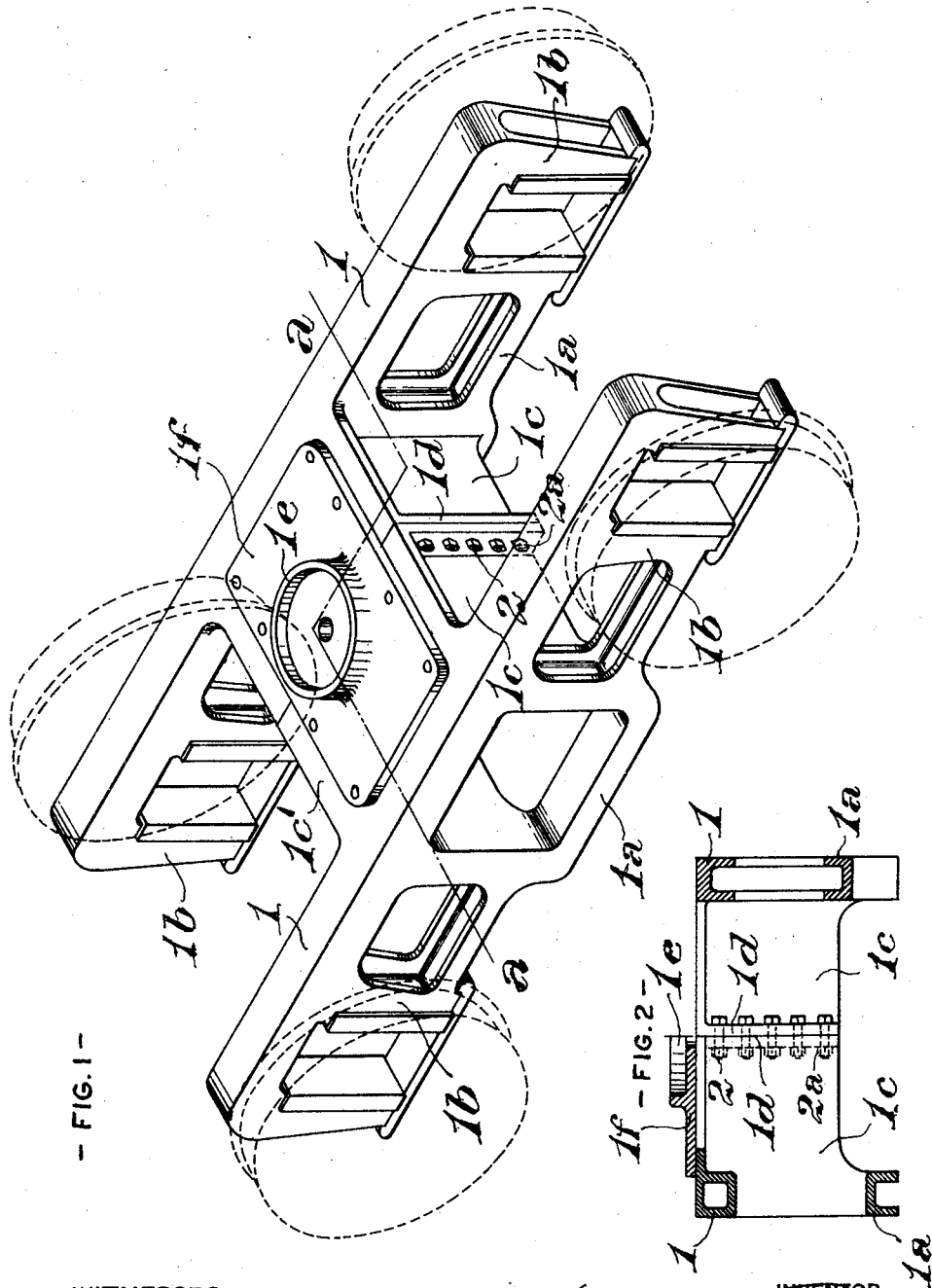

Aug. 7, 1928. 1,679,601
A. W. BRUCE
TRUCK FOR RAILROAD VEHICLES
Filed May 18, 1927  2 Sheets-Sheet 2
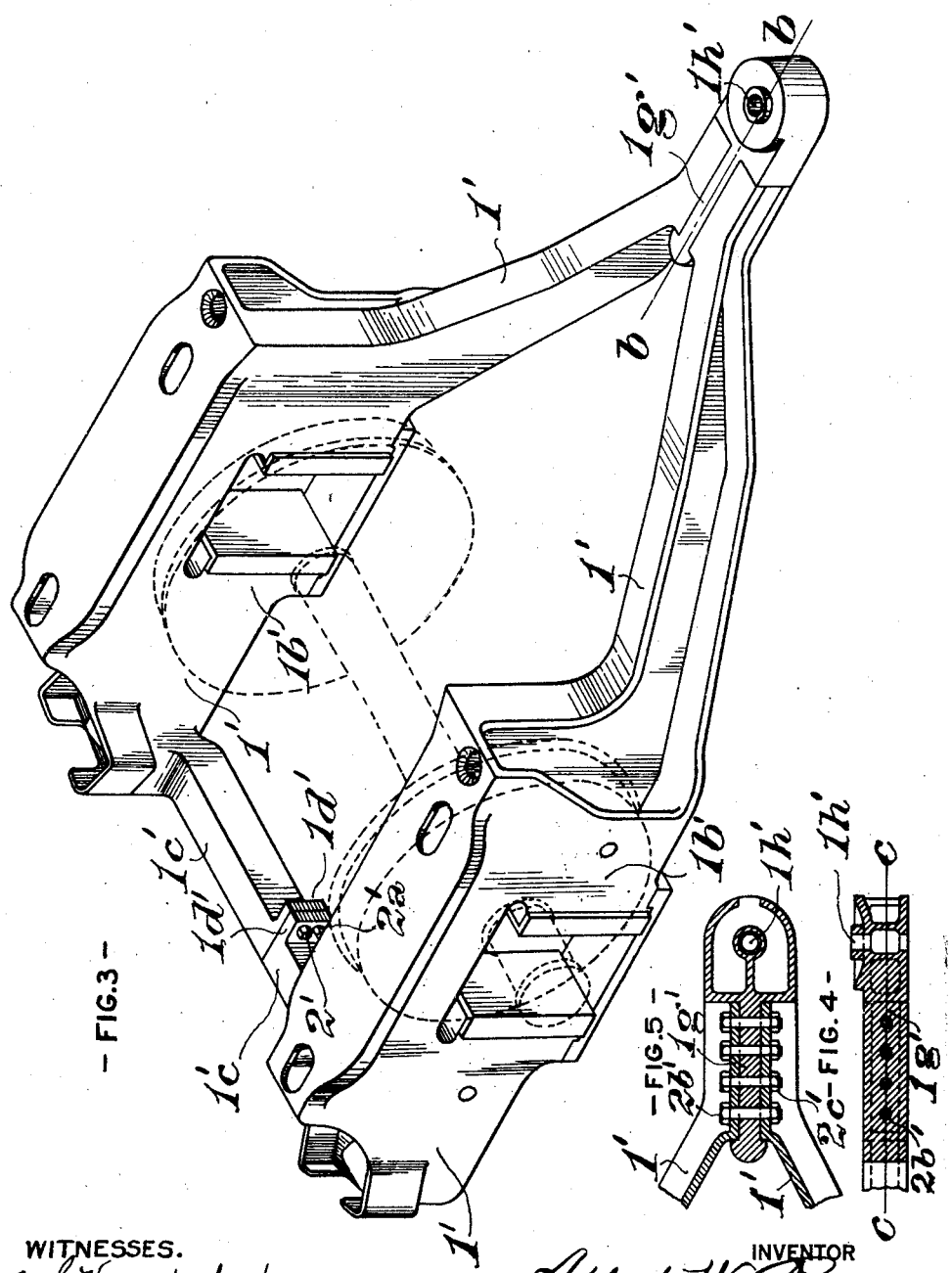

Patented Aug. 7, 1928.

1,679,601

UNITED STATES PATENT OFFICE.

ALFRED W. BRUCE, OF NEW YORK, N. Y.

TRUCK FOR RAILROAD VEHICLES.

Application filed May 18, 1927. Serial No. 192,203.

My invention particularly relates to the frames of trucks for locomotives and other vehicles operating on railroads, and its object is to provide a truck frame of simple, substantial, and economical construction, in which the number of the connections of its principal members shall be materially reduced, and which can be manufactured of cast metal, without involving difficulties in moulding or liability to loss in foundry practice.

The improvement claimed is hereinafter fully set forth.

In the accompanying drawing: Figure 1 is a view, in perspective, of a locomotive leading truck, illustrating an embodiment of my invention; Fig. 2, a vertical transverse section through the same, on the line $a$ $a$, of Fig. 1; Fig. 3, a view, in perspective, of a locomotive trailing truck; Fig. 4, a vertical longitudinal section through the forward portion thereof, on the line $b$ $b$, of Fig. 3, and; Fig. 5, a horizontal longitudinal section, on the line $c$ $c$, of Fig. 4.

In the practice of my invention, referring descriptively to the specific embodiment thereof which is herein exemplified, the leading and characteristic feature of novelty thereof is a fabricated truck frame, adapted for pivotal connection to a main frame structure, and comprising two counterpart side members, each having formed integral therewith, one or more crosstie sections, said sections abutting, and the side members being rigidly secured one to the other, to constitute a complete fabricated truck frame, by riveting, welding, or bolts passing through the crosstie sections. The invention also comprehends the association of other members, hereinafter set forth, with the basic structure above specified.

Referring to the drawing, and first to Figs. 1 and 2, each of the counterpart side members of the truck frame comprises, in an integral part, a top rail, 1, pairs of pedestal jaws, $1^b$, depending from the top rail, in the usual manner, and intermediate pedestal jaw connections, $1^a$, extending from a jaw of one pair to a jaw of an adjacent pair. A plurality of crosstie sections, $1^c$, is formed integral with each of the side frame members. Said crosstie sections are machined on their ends further from the side members, and are of such length that, when brought into abutment in, or substantially in, the middle vertical longitudinal plane of the frame structure, the width of said structure shall be that which is desired for its application in the particular design of railroad vehicle to which the truck is to be applied. The crosstie sections, when so abutted, are secured rigidly together, in the instance exemplified, by bolts, 2, passing through end flanges $1^d$, on the sections, and nuts $2^a$, but my invention is not limited to such specific connecting means, as the connection may be otherwise effected, as by riveting or welding. The crosstie sections may also, if desired, be keyed together, to relieve the bolts from racking strains.

The specific form of the crosstie sections is not an essential of the invention, and they may be of any desired transverse section which, in the discretion of the constructor, appears most desirably adapted to afford proper strength and rigidity, and to facilitate, in the manufacture of cast metal truck frames, the operations of moulding and casting. In the instance herein illustrated, the crosstie sections are of channel form, in transverse section, with bolting flanges, $1^d$, on their abutting ends.

The truck frame structure, as above described, is designed, and adapted for, operative connection to the main frame of a locomotive or other railroad vehicle, with the capacity of swivelling movement, relatively thereto. Different appliances, known in the art, may be coordinated with it for this purpose, as, for example, an annular centre plate, $1^e$, formed on a bed, $1^f$, which is detachably secured to two pairs of abutting crosstie sections, the centre plate being adapted to cooperate with a centre plate on the main frame, in the usual manner.

Figs. 3 to 5 inclusive, illustrate the application of the invention in a two wheel trailing truck, having two side members, $1'$, each of which is formed integral with a pair of pedestal jaws, $1^{b'}$, and with a crosstie section, $1^{c'}$. The forward portions of the side members are inclined, relatively to the rear portions, in which the pedestal jaws are formed, in order to act as radius bars, and in assembling the members of the truck frame, are brought to abut against the sides of a radius pin socket block, $1^{g'}$, located in the middle longitudinal plane of the completed frame structure, at the forward end thereof, and having a radius pin socket, $1^{h'}$, formed in it. The side members, $1'$, are connected to the block, $1^{g'}$, and to each other, by bolts, $2^{b'}$, and nuts, $2^{c'}$. The crosstie sections, $1^{c'}$, which are located at the opposite end of the frame structure, abut, by bolting flanges, $1^{d'}$, in the middle longitudinal plane thereof, and are connected by bolts, $2'$, and nuts, $2^{a'}$.

It will be obvious to those skilled in the art, that my invention is advantageous and desirable in practice, by reason of the facility which it affords, when the truck frame is fabricated of cast metal, in simplifying and perfecting the operations of moulding and casting the constituent members of the frame structure, and in machining and assembling them. The side members being counterpart and connected in or near the middle plane of the structure, fewer bolts will be required, and ample bearing surface is provided on the connecting flanges, to secure a strong, rigid, and readily accessible structure.

I claim as my invention and desire to secure by Letters Patent:

1. In a fabricated truck frame for railroad vehicles, the combination of two counterpart side members, each comprising, in an integral structure, a top rail, pedestal jaws, depending therefrom, and one or more laterally projecting crosstie sections, each of which abuts against a counterpart section on the other side member; means by which the abutting sections are rigidly secured, one to the other; and means for pivotally connecting the assembled members to the main frame of a railroad vehicle.

2. In a fabricated truck frame for railroad vehicles, the combination of two counterpart side members, each comprising, in an integral structure, a top rail, pedestal jaws, depending therefrom, and one or more laterally projecting crosstie sections, having end bolting flanges, each of which abuts against a counterpart flange on a section of the other side member; bolts, passing through the bolting flanges and rigidly securing the abutting sections, one to the other; and means for pivotally connecting the assembled members to the main frame of a railroad vehicle.

3. In a fabricated trailing truck frame for railroad vehicles, the combination of two counterpart side members, each comprising, in an integral structure, a top rail, pedestal jaws, depending therefrom, and a laterally projecting crosstie section, adjacent to one of its ends; means by which said crosstie sections are rigidly secured, one to the other; means by which the side members are rigidly secured one to the other, at their ends further from the crosstie sections; and means for pivotally connecting the assembled members to the main frame of a railroad vehicle.

4. In a fabricated trailing truck frame for railroad vehicles, the combination of two counterpart side members, each comprising, in an integral structure, a top rail, pedestal jaws, depending therefrom, and a laterally projecting crosstie section, adjacent to one of its ends; means by which said crosstie sections are rigidly secured, one to the other; and a socket block, interposed between, and secured to, the ends of the side members further from the crosstie sections, and having a radius pin socket.

5. A trailing truck side member for railroad vehicles, comprising, in an integral part, a top rail; pedestal jaws, depending therefrom; and a crosstie section, projecting laterally, adjacent to the rear end of the top rail, the portion of said rail forward of that on which the crosstie section and pedestal jaws are formed, being inclined, relatively to the rear portion, to act as a radius bar member.

ALFRED W. BRUCE.